Oct. 24, 1933.   E. K. LYNN   1,932,080
VARIABLE LOAD BRAKE
Filed Feb. 19, 1930
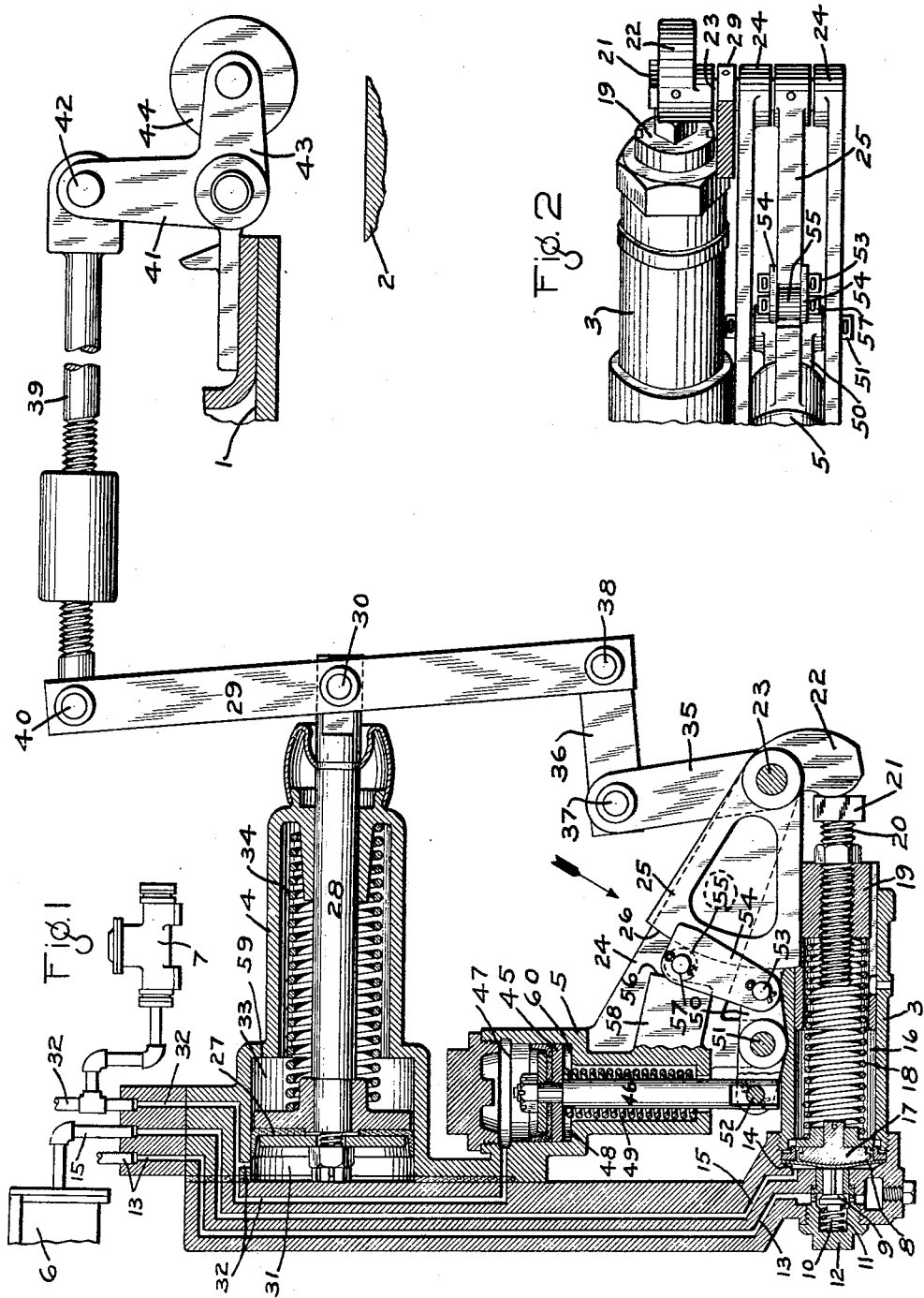
INVENTOR
EWING K. LYNN
BY *Wm. N. Cady*
ATTORNEY Patented Oct. 24, 1933

1,932,080

UNITED STATES PATENT OFFICE 1,932,080

VARIABLE LOAD BRAKE

Ewing K. Lynn, East McKeesport, Pa., assignor to The Westinghouse Air Brake Company, Wilmerding, Pa., a corporation of Pennsylvania Application February 19, 1930. Serial No. 429,574

19 Claims. (Cl. 303—22)

This invention relates to devices for varying the braking power on a vehicle according to the load and more particularly to the means which are automatically operative for locking such devices in their adjusted positions.

Heretofore, in variable load brake apparatus, it has been proposed to use ratchet locking mechanisms of various types for maintaining said apparatus in various adjusted positions, but it has been discovered that these mechanisms do not always operate to maintain the adjustment of the apparatus such that it will operate to accurately limit the brake cylinder pressure according to the load on the vehicle.

The reason for this is that in these mechanisms the minimum adjustment which can be obtained is the space between two adjacent ratchet teeth, and when the load on the car is such that the locking pawl will not engage either one of these teeth, the adjustment cannot be held and the apparatus will operate to release the adjustment until the ratchet pawl engages the next tooth, thus decreasing the pressure of the regulating spring.

In these ratchet mechanisms, the ratchet teeth are arranged as close together as possible so as to provide for fine variations in brake cylinder pressure according to the load on the car, but it has been found that when the teeth are arranged so as to provide these fine variations, they are not strong enough to withstand the forces to which they are subjected and break and impair the operation of the apparatus.

The principal object of my invention is to provide a variable load brake apparatus for a vehicle which will operate to accurately regulate the braking power according to the load on the vehicle and which is well adapted to withstand the forces to which it is subjected in service.

Another and more specific object of my invention is to provide a friction locking mechanism for a variable load brake apparatus which will effectively maintain said apparatus in any of its various adjusted positions.

Other objects and advantages of my invention will appear in the following detailed description.

In the accompanying drawing; Fig. 1 is a diagrammatic view, mainly in section, of one form of variable load brake apparatus embodying my invention; and Fig. 2 is a plan view of a portion of the apparatus as viewed in the direction of the arrow in Fig. 1.

In the present embodiment of the invention as shown in the drawing, the reference character 1 indicates a portion of a vehicle body which is supported on the usual vehicle trucks, a portion 2 of one of said trucks being illustrated.

Carried by the car body is a variable load brake apparatus which may comprise a brake cylinder pressure limiting valve device 3, a strut cylinder device 4, a locking mechanism 5, a brake cylinder 6 and a door engine 7.

The brake cylinder pressure limiting valve device 3 may comprise a casing in which there is mounted a flexible diaphragm 8, which is operative to control the operation of a supply valve 9 contained in a valve chamber 10. Also contained in the chamber 10 is a spring 11 which is interposed between a cap nut 12, having screw-threaded connection with the casing, and one side of the valve 9, the pressure of which spring tends to seat the valve 9.

The supply valve chamber 10 is constantly connected to the service port of the usual brake application valve, (not shown), through a passage and pipe 13. The chamber 14, at one side of the flexible diaphragm 8 is constantly connected to the brake cylinder 6 through a passage and pipe 15.

Contained in a chamber 16, at the other side of the flexible diaphragm 8 and engaging the diaphragm, is a follower 17, which is subject to the pressure of an adjustable spring 18, said spring being adjusted by means of a plunger 19, which is slidably mounted in the open end portion of the casing, and which is in engagement with the outer end of the spring 18.

Having screw-threaded connection with the plunger 19 and extending outwardly therefrom, is a bolt 20 having a head 21 which is adapted to be engaged by an arm 22 secured to a shaft 23, rotatably mounted in spaced brackets 24 which may be integral with the casing of a portion of the locking mechanism 5 or any other fixed part of the apparatus or vehicle body.

Also secured to the shaft 23 and arranged between the brackets 24 is an arm 25 which, at its free end, is provided with a curved surface 26 preferably in the form of an arc of a circle struck from a center slightly above a point corresponding with the axis of the shaft 23. However, if desired, this surface may be made in the form of an arc of a circle struck from a point corresponding with the axis of the shaft 23.

The strut cylinder device 4 may comprise a casing containing a piston 27 having a stem or strut 28 which extends through an opening in the outer end of the casing and which, adjacent its outer end, is operatively connected to a lever 29 by a pin 30. The chamber 31 at one side of the piston 27 is constantly connected to a passage and pipe 32, which, in the present embodiment of the invention, is the usual door opening passage and pipe. The chamber 33, at the other side of the piston 27, contains a spring 34, the pressure of which tends to urge the piston toward the left hand.

Also secured to the shaft 23, is an arm 35, the free end of which is operatively connected to one end of the lever 29, at one side of the pin 30, by a link 36 and pivot pins 37 and 38, the pin 37 passing through the arm 35 and the link 36 and the pin 38 passing through the lever 29 and link 36. At the other side of the pin 30, the end of the lever 29 is operatively connected to the inner end of a link or rod 39 through the medium of a pin 40. The outer end of this rod 39 is operatively connected to the arm 41 of a bell crank, by a pin 42, which bell crank is pivotally mounted on the vehicle body. The other arm, 43, of the bell crank is adapted upon movement of the rod 39, in the direction toward the right hand, to move a roller 44, carried by the arm 43, into engagement with the portion 2 of the vehicle truck.

The locking mechanism 5 may comprise a casing containing a piston 45 having a stem 46 which extends through an opening in one end of the casing. The chamber 47, at one side of the piston 45, is constantly connected to the passage 32. The chamber 48, at the other side of this piston, contains a spring 49, the pressure of which tends to move the piston 45 and its stem upwardly.

Arranged between the brackets 24 is a lever 50 which is pivotally mounted, intermediate its ends, on a pin 51 carried by the brackets 24. One end of this lever is operatively connected with the lower or outer end portion of the piston stem 46 by means of a pin 52 and operatively connected to the other end of the lever by a pin 53, and extending upwardly therefrom are spaced links 54. Arranged between and carried by the upper end portions of these links is a friction locking element 55 which is adapted to be moved into and out of frictional locking engagement with the surface 26 of the arm 25 and a surface 56 formed on a lug 58 extending outwardly from the casing of the locking mechanism. The surface 56 is so disposed that as the links 54 are moved downwardly, the element 55 will be wedged between the surfaces 26 and 56 of the arm 25 and lug 58, respectively, and thus lock the arm 25 in an adjusted position.

In the present embodiment of the invention, the friction locking element 55 is shown as comprising a roller which is mounted on a pin carried by the links 54. I prefer to mount the element 55 in this manner so that when it is out of locking engagement with the surfaces 26 and 56 or being moved into and out of locking engagement with these surfaces, it is free to rotate, thus reducing the wear of the roller and cooperating friction surfaces to a minimum and ensuring the even wear of the element.

The links 54 are preferably made wide enough to overlap the opposite sides of the outer end portions of the arm 25 and lug 58 and are so spaced apart that they are adapted to slidably engage said sides, thus this construction provides simple and effective means for preventing excessive transverse movement of the links 54 and element 55 relative to the arm 25 and lug 58.

In the drawing, the several parts of the apparatus are shown in their adjusted positions with the vehicle empty.

In effecting an application of the brake, fluid under pressure supplied to the pipe and passage 13 flows to the brake cylinder 6 past the unseated valve 9 and its fluted stem, through diaphragm chamber 14 and passage and pipe 15. Now when the brake cylinder pressure in the chamber 14, acting on one side of the diaphragm 8, is sufficient to overcome the opposing pressure of the adjusted spring 18, the diaphragm will flex toward the right hand, permitting the pressure of the spring 11 to move the valve 9 to its seated position, closing off the further supply of fluid under pressure to the brake cylinder and thus limiting the brake cylinder pressure to that desired for bringing an empty vehicle to a stop.

Now when the empty vehicle has been brought to a stop and it is desired to open the door, fluid under pressure is supplied to the door opening side of the door engine 7 through pipe 32, and causes the door engine to operate to door open position.

Fluid under pressure thus supplied to the pipe and passage 32 also flows to the chamber 31 in the strut cylinder device 4 and also to the chamber 47 in the casing of the locking mechanism 5.

The fluid under pressure building up in the piston chamber 31 forces the piston 27 and strut 28 outwardly against the pressure exerted by the spring 34 until the piston is brought to a stop by its engagement with a shoulder 59 formed in the casing. Since the locking element 55 is in locking engagement with arm 25 and lug 58, and the arm 22 is in engagement with the bolt 20 secured to the spring-pressed plunger 19, the shaft 23, arm 35 and link 36 are held against movement, so that the pin 38 will act as a fulcrum for the lever 29 as the lever is moved by the strut 28. With the pin 38 as a fulcrum, the lever 29 operates to push the rod 39 toward the right hand rotating the bell crank so as to bring the roller 44 carried by the arm 43 thereof into engagement with the portion 2 of the vehicle truck.

Now, when the pressure of fluid building up in the piston chamber 47 in the casing of the locking mechanism, and acting on one side of the piston 45, is sufficient to overcome the pressure exerted on the other side of the piston by the spring 49, the piston and piston stem 46 will move downwardly until they are brought to a stop by the piston engaging a shoulder 60 formed in the casing. This downward movement of the stem 46 causes the lever 50 to rock on the pin 51 so that the links 54 are moved upwardly carrying the locking element 55 out of locking engagement with the arm 25 and lug 58.

If the load on the vehicle is now increased, the truck springs will be compressed and the vehicle body will move downwardly relative to the truck, so that the portion 2 of the truck, acting on the arm 43 through the medium of the roller 44, causes an anti-clockwise movement of the bell crank, which exerts a force through the rod 39 to cause an anti-clockwise rotation of the lever 29, with the pivot pin 30 as a fulcrum, the strut 28 being maintained in its extreme outer position by the pressure of fluid in the piston chamber 31 acting on the piston 27.

When the lever 29 is thus rotated, the lower end thereof, through the medium of the link 36, pulls the arm 35 toward the right hand, rocking the shaft 23 and arm 25 in a clockwise direction, the locking element 55 offering no resistance to such movement of the arm 25 since it is maintained out of wedging engagement with the arm and lug 58 by the pressure of fluid in the piston chamber 47 acting on the piston 45.

As the shaft 23 is thus being rotated, the arm 22 secured thereto, through the medium of the bolt 20, forces the plunger 19 inwardly compressing the spring 18 correspondingly with the increase in the load on the vehicle.

When the vehicle has been loaded, the pipe 32 is vented to the atmosphere to permit the door engine to operate to close the door of the vehicle.

With the pipe 32 thus vented to the atmosphere the piston chambers 31 and 47 are consequently vented. It will here be noted that the pressure of the spring 49 is such that it will cause the piston 45 to move upwardly before the strut piston 27 begins to move toward the left hand. As the piston 45 is moved upwardly by the pressure of the spring 49, the piston rod 46 causes the lever 50 to be rocked in a clockwise direction about the pin 51, moving the links 54 and locking element 55 carried by the links, downwardly. When the element 55 is thus moved, it is brought into locking engagement with the surfaces 26 and 56 of the arm 25 and lug 58, respectively.

Now, when the pressure of fluid in the piston chamber 31 has reduced sufficiently, the pressure of the spring 34 will cause the strut piston 27 to return to its extreme left hand position as shown in Fig. 1 and in so doing, operates the strut 28, lever 29, rod 39 and bell crank in such a manner that the roller carried by the arm 43 of the bell crank will be moved out of engagement with the portion 2 of the vehicle truck.

With the locking element 55 in locking engagement with the arm 25 and lug 58 as above described, the outward pressure of the spring 18 acting through the plunger 19, bolt 20, arm 22 and shaft 23, will not affect the adjustment of the arm 25 so that the adjustment of the spring 18 is maintained.

When the apparatus is thus adjusted for a loaded vehicle, the brake cylinder pressure obtained in effecting a subsequent brake application will be greater than that obtained when the vehicle was empty and this is due to the increased pressure of the spring 18 on the flexible diaphragm 8.

Should the load on the vehicle be decreased when the locking element 55 is out of locking engagement with the arm 25 and lug 58, the pressure of the spring 18 will force the plunger 19 and bolt 20 outwardly, rotating the arm 22 and consequently the shaft 23, arms 25 and 35 in an anti-clockwise direction. This movement of the arm 35 also causes the lever 29 to rotate in a clockwise direction about the pin 30 so that as the load is decreased, the roller 44 will be maintained in engagement with the portion 2 of the truck.

Now, when the pipe 32 is vented to the atmosphere, the apparatus will operate as before described to maintain the adjustment of the spring 18.

Whilst the friction surface 26 of the arm 25 may be of any suitable shape, I prefer to make it curved in the form of an arc of a circle struck from a center above a point corresponding with the axis of the shaft 23. It will be seen that with the friction surface 26 so formed, the friction element 55 will be caused to engage the friction surface 56 of the lug 58 at different points along a portion of the length of the surface in locking the apparatus in its various adjusted positions, thus effectively guarding against the roller forming grooves in the surface 56.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a variable load brake apparatus for a vehicle, the combination with means for adjusting the braking power according to the load on the vehicle, of fluid pressure controlled wedge means for maintaining the adjusting means in an adjusted position.

2. In a variable load brake apparatus for a vehicle, the combination with means for adjusting the braking power according to the load on the vehicle, of a locking wedge element movable into frictional locking engagement with the adjusting means for maintaining the adjusting means in an adjusted position.

3. In a variable load brake apparatus for a vehicle, the combination with means for adjusting the braking power, according to the load on the vehicle, of a locking wedge element movable into frictional locking engagement with the adjusting means for maintaining the adjusting means in an adjusted position, and a spring for moving said locking element.

4. In a variable load brake apparatus for a vehicle, the combination with means for adjusting the braking power according to the load on the vehicle, of a locking wedge element movable into frictional locking engagement with the adjusting means for maintaining the adjusting means in an adjusted position, and movable out of locking engagement to permit the adjusting means to operate to another adjusted position, and pressure sensitive means for controlling the operation of said locking element.

5. In a variable load brake apparatus for a vehicle, the combination with means for adjusting the braking power according to the load on the vehicle, of a wedge element for locking said means in an adjusted position, and means operated by fluid under pressure for operating said element to release the adjusting means.

6. In a variable load brake apparatus for a vehicle, the combination with means for adjusting the braking power according to the load on the vehicle, of a movable friction element included in said means, a stationary friction element, and a locking element movable into locking engagement with said friction elements for maintaining said means in an adjusted position.

7. In a variable load brake apparatus for a vehicle, the combination with means for adjusting the braking power according to the load on the vehicle, of a movable friction element included in said means, a stationary friction element, and a roller movable into wedging engagement with said friction elements for maintaining said means in an adjusted position.

8. In a variable load brake apparatus for a vehicle, the combination with means for adjusting the braking power according to the load on the vehicle, of an adjustable friction element included in said means, a stationary friction element, a locking member interposed between and movable relative to said friction elements, mechanism for moving said locking member, and means included in said stationary friction element for forcing said locking member into frictional locking engagement with said adjustable friction element when said locking member is moved in one direction relative to said friction elements for maintaining the adjusting means in an adjusted position.

9. In a variable load brake apparatus for a vehicle, the combination with means for adjusting the braking power according to the load on the vehicle, of an adjustable element included in said means, a stationary element, said elements having oppositely disposed converging friction surfaces, a locking member adapted to be wedged between said friction surfaces for maintaining the adjusting means in an adjusted position, and means for operating said locking member.

10. In a variable load brake apparatus for a vehicle, the combination with means for adjusting the braking power according to the load on the vehicle, of an adjustable element included in said means, a stationary element, said element having oppositely disposed converging friction surfaces, a locking member adapted to be wedged between said friction surfaces for maintaining the adjusting means in an adjusted position, a link for operating said locking element, a lever for operating said link, and pressure sensitive means for operating said lever.

11. In a variable load brake apparatus for a vehicle, the combination with means for adjusting the braking power according to the load on the vehicle, of a movable friction element included in said means, a stationary friction element, a locking element movable into frictional locking engagement with said friction elements for maintaining the adjusting means in an adjusted position, and mechanism for operating said locking element, said mechanism comprising a link cooperating with at least one of said friction elements for guiding said locking element as it is operated.

12. In a variable load brake apparatus for a vehicle, the combination with means for adjusting the braking power according to the load on the vehicle, of an adjustable element included in said means, a stationary element, said elements having oppositely disposed converging friction surfaces, a locking member adapted to be wedged between said friction surfaces for maintaining the adjusting means in an adjusted position and adapted to be moved out of its wedged position to permit the adjusting means to operate to another adjusted position, and fluid pressure controlled means for operating said locking member.

13. In a variable load brake apparatus for a vehicle, the combination with means for adjusting the braking power according to the load on the vehicle, of an adjustable element included in said means, a stationary element, said elements having oppositely disposed converging friction surfaces, a roller adapted to be wedged between said friction surfaces for locking the adjusting means in an adjusted position, and means for moving said locking member into and out of its wedged position.

14. In a variable load brake apparatus for a vehicle, the combination with means for adjusting the braking power according to the load on the vehicle, of a rockable element included in said means adjustable according to the load on the vehicle, and a locking element movable into locking engagement with said rockable element for locking said means in an adjusted position.

15. In a variable load brake apparatus for a vehicle, the combination with means for adjusting the braking power according to the load on the vehicle, of a rockable element included in said means adjustable according to the load on the vehicle, and a locking element wedged into locking engagement with said rockable element for locking said means in an adjusted position.

16. In a variable load brake apparatus for a vehicle, the combination with means for adjusting the braking power according to the load on the vehicle, of a rockable friction element included in said means adjustable according to the load on the vehicle, and a locking element movable into frictional locking engagement with said rockable friction element for locking said means in an adjusted position.

17. In a variable load brake apparatus for a vehicle, the combination with means for adjusting the braking power according to the load on the vehicle, of an adjustable member included in said means having a curved friction locking surface and adjustable according to the load on the vehicle, and friction locking means movable into frictional locking engagement with said curved friction face for maintaining the adjusting means in an adjusted position.

18. In a variable load brake apparatus for a vehicle, the combination with means for adjusting the braking power according to the load on the vehicle, of a cam included in said means adjustable according to the load on the vehicle and having a friction locking surface, and means operable into frictional locking engagement with the friction locking surface of said cam for maintaining the adjusting means in an adjusted position.

19. In a variable load brake apparatus for a vehicle, the combination with means for adjusting the braking power according to the load on the vehicle, of a rockable element included in said means adjustable according to the load on the vehicle, a locking element movable into locking engagement with said rockable element for locking said means in an adjusted position and movable out of locking engagement to permit the adjustment of said rockable member, and fluid pressure means for controlling the operation of said locking element.

EWING K. LYNN.